(12) United States Patent
Yu et al.

(10) Patent No.: US 9,468,002 B2
(45) Date of Patent: Oct. 11, 2016

(54) METHOD, SYSTEM AND EQUIPMENT FOR DETERMINING TRANSMISSION SUBFRAME

(71) Applicant: Huawei Technologies Co., Ltd., Shenzhen (CN)

(72) Inventors: Zheng Yu, Beijing (CN); Sha Ma, Beijing (CN); Qiang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/335,557

(22) Filed: Jul. 18, 2014

(65) Prior Publication Data

US 2014/0348088 A1    Nov. 27, 2014

Related U.S. Application Data

(63) Continuation of application No. PCT/CN2013/070761, filed on Jan. 21, 2013.

(30) Foreign Application Priority Data

Jan. 19, 2012 (CN) .......................... 2012 1 0018163

(51) Int. Cl.
*H04W 72/04* (2009.01)
*H04L 1/00* (2006.01)
*H04W 76/02* (2009.01)

(52) U.S. Cl.
CPC ............ *H04W 72/0446* (2013.01); *H04L 1/00* (2013.01); *H04L 1/0026* (2013.01); *H04W 76/023* (2013.01)

(58) Field of Classification Search
CPC .................... H04W 72/0446; H04W 72/1257; H04L 1/0026
See application file for complete search history.

(56) References Cited

U.S. PATENT DOCUMENTS

| 2008/0032625 | A1 | 2/2008 | Cheung et al. | |
| 2011/0286369 | A1* | 11/2011 | Kosaka | H04W 56/002 370/280 |
| 2013/0215880 | A1 | 8/2013 | Kosaka | |
| 2014/0198766 | A1* | 7/2014 | Siomina | H04W 72/082 370/330 |

FOREIGN PATENT DOCUMENTS

| CN | 1478366 A | 2/2004 |
| CN | 101110658 A | 1/2008 |

(Continued)

OTHER PUBLICATIONS

Esseling, N., et al., "Performance Evaluation of a Fixed Relay Concept for Next Generation Wireless Systems," Personal, Indoor and Mobile Communications, 15th IEEE International Symposium, vol. 2, Sep. 5-8, 2004, pp. 744-751.

*Primary Examiner* — Jackie Zuniga Abad
(74) *Attorney, Agent, or Firm* — Slater Matsil, LLP

(57) ABSTRACT

Embodiments of the present invention disclose a method, a system and an equipment. A base station determines a first transmission subframe set for each of user equipments that directly communicate with each other to transmit uplink information within a predetermined time range and a second transmission subframe set for each user equipment to directly transmit data to another user equipment within the predetermined time range respectively. Intersection sets between a second transmission subframe set determined for any user equipment and a first transmission subframe set determined for another user equipment that directly communicates with the user equipment and between the second transmission subframe set determined for the any user equipment and a second transmission subframe set determined for the another user equipment that directly communicates with the user equipment are empty.

15 Claims, 4 Drawing Sheets

(56) References Cited

FOREIGN PATENT DOCUMENTS

| | | |
|---|---|---|
| CN | 101163329 A | 4/2008 |
| CN | 102307060 A | 1/2012 |
| EP | 0713345 A2 | 5/1996 |
| EP | 2753005 A1 | 7/2014 |
| WO | 2010082114 A1 | 7/2010 |
| WO | 2011035100 A2 | 3/2011 |

* cited by examiner

METHOD, SYSTEM AND EQUIPMENT FOR DETERMINING TRANSMISSION SUBFRAME

This application is a continuation of International Application No. PCT/CN2013/070761, filed on Jan. 21, 2013, which claims priority to Chinese Patent Application No. CN 201210018163.3, filed on Jan. 19, 2012, both of which are hereby incorporated by reference in their entirety.

TECHNICAL FIELD

The embodiments of the present invention relate to the field of communications technologies and, in particular embodiments, to a method, a system and equipment for determining a transmission subframe.

BACKGROUND

A wireless communication system is a multiple access system. In the wireless communication system, a base station sends, on a downlink, downlink data and/or control information to a user equipment (UE), and receives, on an uplink, uplink data and/or control information sent by the user equipment. Communication between the base station and the user equipment may be performed by using a frequency division duplex (FDD) manner or a time division duplex (TDD) manner.

Generally, when two user equipments need to communicate with each other, a source user equipment first needs to transmit data to a base station or a network, and then the base station or the network transmits the received data to a destination user equipment. In order to increase a capacity of a communication system to satisfy a requirement of the user equipment for high speed services, user equipments close to each other may directly perform data transmission, thereby reducing an overhead of a transmission resource, such as time, a frequency, a code channel, and power, between the user equipment and the base station; and a transmission resource may be multiplexed between different user equipments far away from each other, thereby further increasing resource utilization efficiency, and improving a throughput of the system.

In the prior art, the base station only allocates transmission resources for communication between the base station and the user equipment, and determines, according to an uplink service load and a downlink service load, allocation of an uplink transmission resource and a downlink transmission resource for the communication. However, in an existing transmission resource allocation method, transmission resources for direct communication between user equipments are not considered.

SUMMARY

Embodiments of the present invention provide a method for determining a transmission subframe and a base station, so that allocation of transmission resources for direct communication between user equipments is also considered when transmission resources for data transmission between a user equipment and a base station is allocated to the user equipment, thereby improving system resource utilization efficiency.

An embodiment of the present invention provides a method for determining a transmission subframe, where the method is used to determine a transmission subframe for data transmission between multiple user equipments which directly communicate with each other, and includes: determining a first transmission subframe set and a second transmission subframe set of a user equipment within a predetermined time range, where the first transmission subframe set is a set of a subframe on which the user equipment transmits uplink information, the second transmission subframe set is a set of a subframe on which the user equipment directly transmits data to another user equipment, and intersection sets between the second transmission subframe set of the user equipment and a first transmission subframe set of another user equipment that directly communicates with the user equipment and between the second transmission subframe set of the user equipment and a second transmission subframe set of the another user equipment that directly communicates with the user equipment are empty; and notifying information of the second transmission subframe set of the user equipment to the user equipment.

An embodiment of the present invention provides a method for determining a transmission subframe. The method includes acquiring information of a second transmission subframe set of a user equipment within a predetermined time range, where the second transmission subframe set is a set of a subframe on which the user equipment directly transmits data to another user equipment; and directly transmitting data to the another user equipment on the second transmission subframe set of the user equipment.

An embodiment of the present invention provides a base station that is configured to determine a transmission subframe for data transmission between multiple user equipments which directly communicate with each other. The base station includes a subframe determining unit, which is configured to determine a first transmission subframe set and a second transmission subframe set of the user equipment within a predetermined time range. The first transmission subframe set is a set of a subframe on which the user equipment transmits uplink information, the second transmission subframe set is a set of a subframe on which the user equipment directly transmits data to another user equipment, and intersection sets between the second transmission subframe set of the user equipment and a first transmission subframe set of another user equipment that directly communicates with the user equipment and between the second transmission subframe set of the user equipment and a second transmission subframe set of the another user equipment that directly communicates with the user equipment are empty. A notifying unit is configured to notify information of the second transmission subframe set determined by the subframe determining unit to the user equipment.

An embodiment of the present invention provides a user equipment. A subframe information acquiring unit is configured to acquire information of a second transmission subframe set of the user equipment. The second transmission subframe set is a set of a subframe on which the user equipment directly transmits data to another user equipment within a predetermined time range. A transmitting unit is configured to directly transmit data to the another user equipment on the second transmission subframe set which is of the user equipment and corresponds to the information acquired by the subframe information acquiring unit.

An embodiment of the present invention provides a system for determining a transmission subframe. The system is used to determine a transmission subframe for data transmission between multiple user equipments which directly communicate with each other, and includes a base station and at least two user equipments which directly communicate with each other. The base station is configured to determine a first transmission subframe set and a second transmission subframe set of the user equipment within a predetermined time range. The first transmission subframe set is a set of a subframe on which the user equipment transmits uplink information, the second transmission subframe set is a set of a subframe on which the user equipment directly transmits data to another user equipment, and intersection sets between the second transmission subframe set of the user equipment and a first transmission subframe set of another user equipment that directly communicates with the user equipment and between the second transmission subframe set of the user equipment and a second transmission subframe set of the another user equipment that directly communicates with the user equipment are empty; and notify information of the determined second transmission subframe set to the user equipment. The user equipment is configured to acquire the information of the second transmission subframe set of the user equipment, and directly transmit data to the another user equipment on the second transmission subframe set of the user equipment.

In the embodiments, a base station determines a first transmission subframe set for each of user equipments which directly communicate with each other to transmit uplink information within a predetermined time range and a second transmission subframe set for each user equipment to directly transmit data to another user equipment within the predetermined time range respectively, where intersection sets between a second transmission subframe set determined for any user equipment and a first transmission subframe set determined for another user equipment that directly communicates with the user equipment and between the second transmission subframe set determined for the any user equipment and a second transmission subframe set determined for the another user equipment that directly communicates with the user equipment are empty; and finally, notifies information of the determined second transmission subframe set to the user equipment. In this way, when two user equipments directly communicate with each other, and when the base station determines transmission resources for data transmission, not only a factor that the base station communicates with each user equipment is considered, but also a factor that the user equipments directly communicate with each other is also considered, so that the base station properly allocates transmission resources to the user equipment, thereby improving system resource utilization efficiency.

BRIEF DESCRIPTION OF THE DRAWINGS

To illustrate the technical solutions in the embodiments of the present invention more clearly, accompanying drawings required for describing the embodiments are introduced briefly in the following. Apparently, the accompanying drawings in the following description are only some embodiments of the present invention, and persons of ordinary skill in the art may further obtain other drawings according to these accompanying drawings without creative efforts.

DETAILED DESCRIPTION OF ILLUSTRATIVE EMBODIMENTS

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
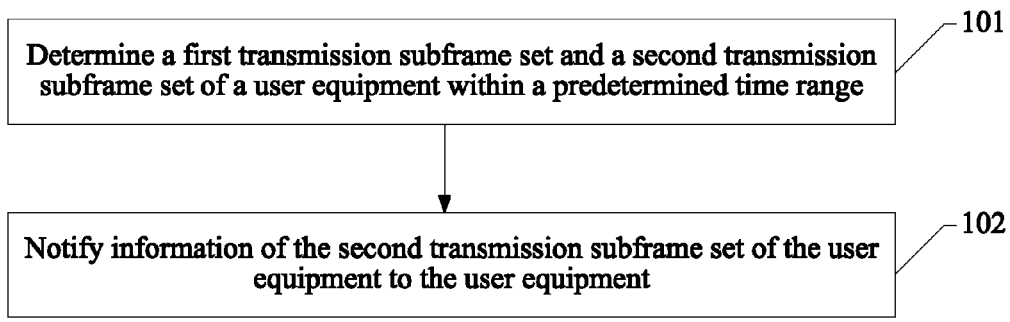
FIG. 1 is a flowchart of a method for determining a transmission subframe according to an embodiment of the present invention.

An embodiment of the present invention provides a method for determining a transmission subframe, so that when multiple user equipments directly communicate with each other, a base station determines a transmission subframe for data transmission between user equipments which directly communicate with each other, and transmission resources for direct communication between user equipments and transmission resources for communication between the base station and each of the user equipments which directly communicate with each other are considered. The method in this embodiment is a method executed by the base station, a flowchart is as shown in FIG. 1. The method includes the following steps.

Step 101: Determine a first transmission subframe set R1 and a second transmission subframe set R2 of a user equipment within a predetermined time range, where the first transmission subframe set R1 is a set of a subframe on which the user equipment transmits uplink information, and the second transmission subframe set R2 is a set of a subframe on which the user equipment directly transmits data to another user equipment.

It may be understood that, uplink information transmitted by each user equipment may include uplink data information and uplink response feedback information, and may further include channel state information, and so on.

The uplink response feedback information is response feedback information of the user equipment to downlink data transmitted by the base station, and includes: an acknowledge (ACK) message or a non acknowledge (NACK) message. Then transmission resources for the user equipment to transmit the uplink response feedback information are determined according to the downlink data sent by the base station to the user equipment, and the base station may consider requirements such as a service transmission load, a transmission delay and quality of service (QoS) on a downlink communication link from the base station to the user equipment, and determine, according to a preset policy, transmission resources for the user equipment to transmit downlink data. The preset policy may include that, if the service transmission load on the downlink communication link in a certain period of time is large, downlink data needs to be sent within preset time after this period of time, so as to further determine sending time and a size of the uplink response feedback information sent by the user equipment within the predetermined time range to the base station. For example, if the base station needs to send the downlink data to the user equipment on an $n^{th}$ transmission subframe, it is determined that the user equipment sends the uplink response feedback information to the base station on an $(n+4)^{th}$ transmission subframe, and occupies a part of time resources of the $(n+4)^{th}$ transmission subframe. The predetermined time range may be a frame formed by multiple transmission subframes or a super frame formed by multiple frames.

The uplink data information may include information such as service data that the user equipment needs to send. The base station may consider requirements such as a service transmission load, a transmission delay and QoS on an uplink communication link from the user equipment to the base station, and determine, according to a preset policy, sending time and a size of the uplink data information sent by the user equipment to the base station. The preset policy may include that, if the QoS on the uplink communication link within a certain period of time is good, it may be determined that the user equipment sends the uplink data information within this period of time. The channel state information is information which is reported periodically or non-periodically by the user equipment and is used to indicate an uplink channel state, and the base station may determine transmission resources for the user equipment to send the channel state information, for example, a transmission subframe on which the user equipment sends the uplink data information and/or the channel state information.

After determining the sending time and the size of the uplink data information, the uplink response feedback information and/or the channel state information sent by the user equipment, the base station determines the first transmission subframe set R1 of the user equipment. For the second transmission subframe set R2, the base station may consider requirements such as a service transmission load, a transmission delay and QoS on a communications link between the user equipment and another user equipment that directly communicates with the user equipment, and determine, according to a preset policy, sending time and a size of data transmitted by the user equipment to the another user equipment that directly communicates with the user equipment, so as to determine the second transmission subframe set R2. The preset policy may include that, if transmission time on the link of direct communication within a certain period of time is short, it is determined that the user equipment directly transmits data within this period of time.

It should be noted that the preset policy may be preset in the base station according to an actual requirement of an operator, and a specific form of the preset policy is not limited in the embodiment of the present invention.

The first transmission subframe set R1 and the second transmission subframe set R2 of each user equipment are respectively used by the user equipment to transmit uplink information and directly transmit data to another user equipment, and cannot be used as a transmission subframe for receiving data, that is, cannot be used as a second transmission subframe set R2 of another user equipment that directly communicates with the user equipment. Therefore, in the multiple user equipments which directly communicate with each other, intersection sets between a second transmission subframe set R2 determined by the base station for any user equipment and a first transmission subframe set R1' determined by the base station for another user equipment and between the second transmission subframe set R2 determined by the base station for the any user equipment and a second transmission subframe set R2' determined by the base station for the another user equipment are empty.

Figure 2:
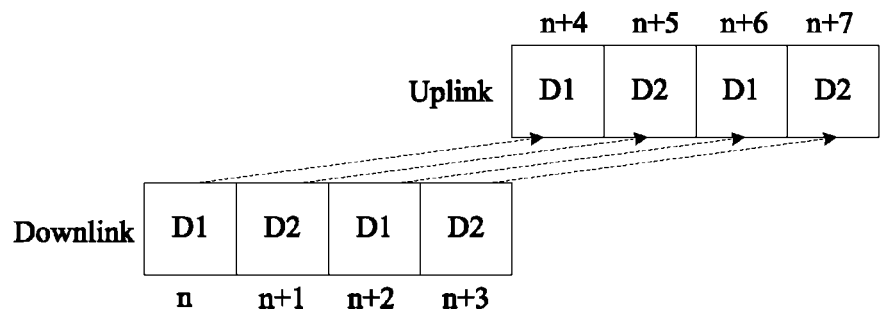
FIG. 2 is a schematic structural diagram of transmission subframes determined by a base station for transmitting uplink and downlink data according to an embodiment of the present invention.

For example, as shown in FIG. 2, in a long term evolution (LTE) system, a base station sends downlink data to a user equipment D1 on a transmission subframe n and a transmission subframe n+2, and the base station sends downlink data to a user equipment D2 on a transmission subframe n+1 and a transmission subframe n+3, and accordingly, the user equipment D1 sends uplink response feedback information to the base station on a transmission subframe n+4 and a transmission subframe n+6. Then, the transmission subframe n+4 and the transmission subframe n+6 cannot be used as subframes on which the user equipment D2 transmits data to the user equipment D1, and similarly, a transmission subframe n+5 and a transmission subframe n+7 cannot be used as subframes on which the user equipment D1 transmits data to the user equipment D2.

Step 102: The base station notifies information of the second transmission subframe set R2 of the user equipment determined in step 101 to the user equipment.

The information of the second transmission subframe set R2 may include information such as the number of included subframes, a position of an included subframe and a usage state of an included subframe.

When notifying the information of the second transmission subframe set R2 to the user equipment, the base station may indicate, in a bitmap manner, a position of a subframe included in the second transmission subframe set R2, for example, a time index of the subframe, and/or a usage state of each subframe, such as a state of being used to send data or receive data, and may bear the information indicated in the bitmap manner in signaling and send the signaling to the user equipment. For example, a new control field is added in signaling of a physical layer control channel, such as a physical downlink control channel (PDCCH), to indicate the position of the subframe and/or the usage state of the subframe included in the second transmission subframe set R2, and the signaling of the physical layer control channel is sent to the user equipment.

Or, a new control element is added in media access control (MAC) layer signaling to indicate the position of the subframe and/or the usage state of the subframe included in the second transmission subframe set R2, and the MAC layer signaling is sent to the user equipment.

Or, a new information element is added in dedicated signaling or common signaling of radio resource control (RRC) to indicate the position of the subframe and/or the usage state of the subframe included in the second transmission subframe set R2, and the dedicated signaling or the common signaling of the RRC is sent to the user equipment. When notifying information of a second transmission subframe set R2 of a user equipment, the base station may notify the information of the second transmission subframe set of the user equipment to the user equipment, and may also notify information of a second transmission subframe set of another user equipment that directly communicates with the user equipment to the user equipment. In this way, the user equipment may know a transmission subframe on which data directly transmitted by the another user equipment is received, and a transmission subframe on which data is directly transmitted to the another user equipment.

In step 101, the base station determines the second transmission subframe set R2 of each of the user equipments which directly communicate with each other within the predetermined time range. In a specific embodiment, the base station may also determine that each user equipment directly communicates with another user equipment according to the second transmission subframe set R2 in a fixed configuration cycle, such as fixed multiple subframes or frames. In this case, the base station further needs to notify the user equipment of the configuration cycle in which each user equipment directly communicates with the another user equipment according to the second transmission subframe set R2 and a configuration starting point, such as a position of a certain subframe or frame, in which each user equipment directly communicates with the another user equipment according to the second transmission subframe set R2. Specifically, the configuration cycle and the configuration starting point may be included in the control field newly added in the signaling of the physical layer control channel, or the information element newly added in the dedicated signaling or the common signaling of the RRC, or the control element newly added in the MAC layer signaling, and then be sent to the user equipment.

It should be noted that, the base station may further notify information of the first transmission subframe set R1 to the user equipment. For a transmission subframe which is used for transmitting the uplink response feedback information and included in the set R1, as long as the user equipment knows a transmission subframe on which the downlink data is received, the transmission subframe for transmitting the uplink response feedback information is determined, and it may not be needed to notify information of the transmission subframe for transmitting the uplink response feedback information to the user equipment.

The first transmission subframe set and the second transmission subframe set do not represent a sequence relationship, and only represent different sets.

It can be seen that, in this embodiment, the base station determines the first transmission subframe set for each of the user equipments which directly communicate with each other to transmit the uplink information within the predetermined time range and the second transmission subframe set for the user equipment to directly transmit data to the another user equipment, where the intersection sets between the second transmission subframe set of the user equipment and the first transmission subframe set of the another user equipment that directly communicates with the user equipment and between the second transmission subframe set of the user equipment and the second transmission subframe set of the another user equipment that directly communicates with the user equipment are empty; and finally, notifies the information of the second transmission subframe set of the user equipment to the user equipments which directly communicate with each other. In this way, when two user equipments directly communicate with each other, and when the base station determines transmission resources for data transmission, not only a factor that the base station communicates with each user equipment is considered, but also a factor that the user equipments directly communicate with each other is also considered, so that the base station properly allocates transmission resources to the user equipment, thereby improving system resource utilization efficiency.

In the foregoing embodiment, the first transmission subframe set R1 determined by the base station for each user equipment in step 101 may include a subset R11 of a subframe on which the user equipment transmits the uplink data information and a subset R12 of a subframe on which the user equipment sends the uplink response feedback information. In a specific embodiment, in order to fully satisfy requirements of direct communication between multiple user equipments and communication between each user equipment and the base station, and to save the transmission resources for the user equipment to transmit data, the base station may determine that the user equipment transmits the uplink response feedback information on the transmission subframe for the user equipment to transmit the uplink data information and/or directly transmit data to the another user equipment, thereby fully utilizing radio resources, which is specifically as follow:

If a subframe subset R12 of a certain user equipment is not included in a union set of a subframe subset R11 and a second transmission subframe set R2 of the user equipment, the base station further needs to adjust a subframe which is determined by the base station for the user equipment to transmit downlink data, so that the subset R12 of the subframe on which the user equipment transmits uplink response feedback information corresponding to the downlink data is included in the union set of the subframe subset R11 and the second transmission subframe set R2 of the user equipment.

If, in addition to the subframe subset R11 and the subframe subset R12, the first transmission subframe set R1 determined by the base station for each user equipment in step 101 further includes a subset R13 of a subframe on which the user equipment transmits the channel state information to the base station, and the subframe subset R13 of the user equipment is not included in the union set of the subframe subset R11 and the second transmission subframe set R2 of the user equipment, the base station may further adjust the subset R13 of the subframe determined for the user equipment to transmit the channel state information, so that the subset R13 of the subframe on which the user equipment transmits the channel state information is included in the union set of the subframe subset R11 and the second transmission subframe set R2. In this case, the user equipment may transmit the channel state information to the base station on the transmission subframe for transmitting the uplink data information and/or for directly transmitting data to the another user equipment.

In another specific embodiment, when determining the transmission subframe in step 101, the base station may enable transmittable subframes included in the first transmission subframe set R1 and the second transmission subframe set R2 that are determined for each user equipment to be consecutive within the predetermined time range.

Figure 3:
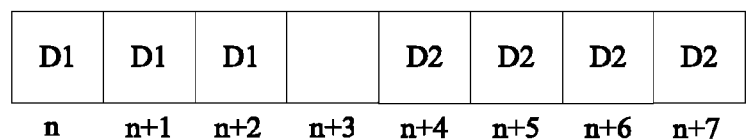
FIG. 3 is a schematic structural diagram of transmission subframes determined by a base station according to an embodiment of the present invention.

For example, as shown in FIG. 3, the $n^{th}$ transmission subframe and the $(n+1)^{th}$ transmission subframe included in the first transmission subframe set R1 determined by the base station for the user equipment D1 and the $(n+2)^{th}$ transmission subframe included in the second transmission subframe set R2 determined by the base station for the user equipment D1 are consecutive, so that the transmission subframes on which the user equipment D1 sends data are consecutive, thereby reducing a switch point at which the user equipment performs switching between sending data and receiving data.

In another specific embodiment, an idle subframe is reserved between the subframe included in the second transmission subframe set R2 determined by the base station for any user equipment in step 101 and the subframe included in the second transmission subframe set R2 of another user equipment that directly communicates with the user equipment, and the idle subframe is used for the user equipments which directly communicate with each other to perform state switching between sending data and receiving data. Or, a period of protection time is reserved in the subframe included in the second transmission subframe set determined by the base station for at least one user equipment of user equipments which directly communicate with each other, and the protection time is used for the user equipments which directly communicate with each other to perform state switching between sending and receiving. In this case, the information of the second transmission subframe set notified by the base station to the user equipment in step 102 further needs to include information of the idle subframe or the protection time reserved by the base station.

For example, as shown in FIG. 3, an idle transmission subframe n+3 exists between the transmission subframe determined by the base station for the user equipment D1 to transmit data to the user equipment D2 and the transmission subframe determined by the base station for the user equipment D2 to transmit data to the user equipment D1, so that after the user equipment D1 transmits data to the user equipment D2 on a transmission subframe, an idle transmission subframe is available for the user equipment D1 to switch from a state of sending data to a state of receiving data, and accordingly, the user equipment D1 receives, on a corresponding transmission subframe, data directly transmitted by the user equipment D2.

However, a waste of resources is caused when an idle transmission subframe exists between transmission subframes of any two user equipments. In a specific embodiment, an idle transmission subframe may not be allocated between second transmission subframe sets R2 of any two user equipments, but instead, a period of protection time is reserved in the subframe included in the second transmission subframe set R2 of the at least one user equipment of user equipments which directly communicate with each other. A transmission subframe may be further divided into multiple small transmission symbols, and therefore, the user equipment may use a part of the transmission symbols of the transmission subframe to transmit data to another user equipment, and the other part of the transmission subframe may be used as reserved protection time.

Figure 4:
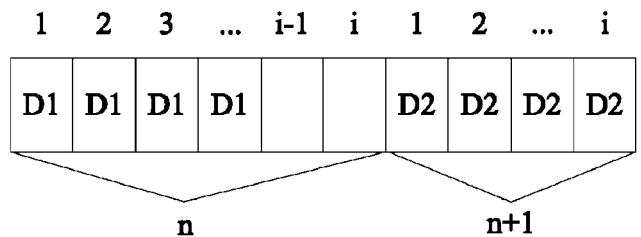
FIG. 4 is another schematic structural diagram of transmission subframes determined by a base station according to an embodiment of the present invention.

For example, as shown in FIG. 4, the $n^{th}$ transmission subframe is the second transmission subframe R2 determined by the base station for the user equipment D1 performing direct communication, and the $(n+1)^{th}$ transmission subframe is the second transmission subframe R2 determined by the base station for the user equipment D2 performing direct communication. Each transmission subframe includes i transmission symbols, and accordingly, an $(i-1)^{th}$ transmission symbol and an $i^{th}$ transmission symbol of the $n^{th}$ transmission subframe are used as the reserved protection time for the user equipment D1 to switch from the state of sending data to the state of receiving data, so as to receive data directly transmitted by the user equipment D2 to the user equipment D1.

In another specific embodiment, in addition to performing the foregoing step 101 and step 102, the base station may further determine a transmission subframe set for downlink retransmission data for the user equipment, so that a subframe on which the user equipment transmits uplink response feedback information corresponding to the downlink retransmission data is included in the subframe subset R12 of the uplink response feedback information included in the first transmission subframe set R1.

The base station may further determine a retransmission interval at which the user equipment transmits the downlink retransmission data as a fixed value, so that the subframe on which the user equipment transmits the uplink response feedback information corresponding to the downlink retransmission data is included in the subset R12 of the subframe on which the user equipment transmits the uplink response feedback information. The retransmission interval is the number of subframes between a moment of a subframe on which the user equipment transmits downlink data for the first time and a moment of a subframe on which the user equipment retransmits the downlink data for the first time; or, the retransmission interval is the number of subframes between a moment of a subframe on which the user equipment retransmits downlink data for the $n^{th}$ time and a moment of a subframe on which the user equipment retransmits the downlink data for the $(n+1)^{th}$ time, where n is a positive integer.

For example, the retransmission interval determined by the base station is m subframes, and accordingly, after sending downlink data on the $n^{th}$ transmission subframe for the first time, the base station resends the downlink data on an $(n+m)^{th}$ transmission subframe. Correspondingly, the user equipment may receive, on the $n^{th}$ transmission subframe, the downlink data sent by the base station, and the user equipment transmits, on an $(n+x)^{th}$ transmission subframe, the uplink response feedback information. According to the retransmission interval m, the user equipment re-receives, on the $(n+m)^{th}$ transmission subframe, the downlink data sent by the base station, and the user equipment transmits, on an $(n+m+x)^{th}$ transmission subframe, the uplink response feedback information. In this embodiment, the base station needs to determine the retransmission interval m, so that the $(n+m+x)^{th}$ transmission subframe is included in the subframe subset R12.

Figure 5:
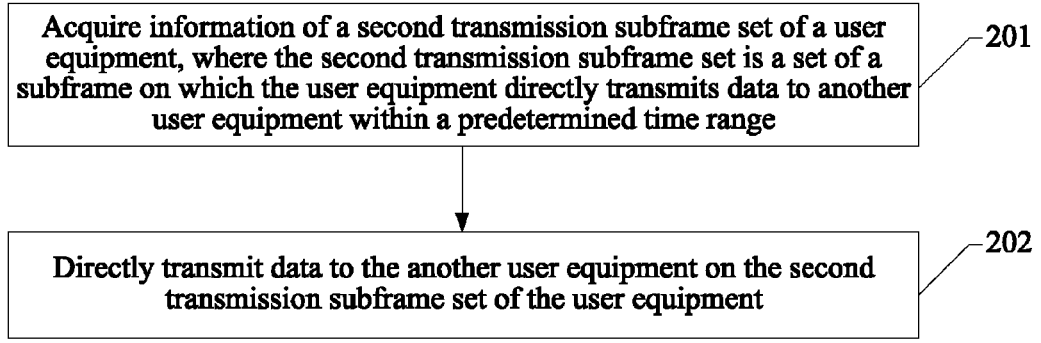
FIG. 5 is a flowchart of a method for determining a transmission subframe according to an embodiment of the present invention.

An embodiment of the present invention provides a method for determining a transmission subframe, so that when multiple user equipments directly communicate with each other, a base station determines a transmission subframe for data transmission between user equipments which directly communicate with each other, and transmission resources for direct communication between user equipments and transmission resources for communication between the base station and each of the user equipments which directly communicate with each other are considered. The method in this embodiment is a method executed by a user equipment, a flowchart is as shown in FIG. 5. The method includes the following steps.

Step 201: Acquire information of a second transmission subframe set R2 of a user equipment within a predetermined time range, where the second transmission subframe set is a set of a subframe on which the user equipment directly transmits data to another user equipment, and the information of the second transmission subframe set may include information such as the number of subframes included in the transmission subframe set, a position of a subframe included in the transmission subframe set and a usage state of the subframe included in the transmission subframe set.

It may be understood that the base station may determine a second transmission subframe set R2 for each of user equipments which directly communicate with each other to directly transmit data to another user equipment. When specifically determining the second transmission subframe set R2, the base station needs to consider a first transmission subframe set R1 for transmitting uplink information between each of the user equipments which directly communicate with each other and the base station. A specific determining method is shown in the embodiment corresponding to FIG. 1, and is not repeatedly described herein. The base station may send information of a second transmission subframe set R2 of a certain user equipment to the user equipment in a certain manner, or the base station may also send information of a second transmission subframe set R2 of another user equipment to the user equipment.

Specifically, when acquiring the information of the second transmission subframe set R2, the user equipment may receive dedicated signaling or common signaling which is of radio resource control and is sent by the base station, and learn, according to an information element newly added in the dedicated signaling or the common signaling, a position of the subframe included in the second transmission subframe set of the user equipment, such as a time index of the subframe, and/or a usage state of each subframe, such as a state of being used to send data or receive data. Or, the user equipment may receive media access control layer signaling sent by the base station, and learns, according to a control element newly added in the media access control layer signaling, the position of the subframe and/or the usage state of the subframe included in the second transmission subframe set of the user equipment. Or, the user equipment may also receive signaling which is of a physical layer control channel and is sent by the base station, and learn, according to a control field newly added in the signaling of the physical layer control channel, the position of the subframe and/or the usage state of the subframe included in the second transmission subframe set of the user equipment.

It should be noted that, the information element newly added in the dedicated signaling or the common signaling, or the control element newly added in the media access control layer signaling, or the control field newly added in the signaling of the physical layer control channel may further indicate: a configuration cycle of the second transmission subframe set R2 used when the user equipment directly communicates with the another user equipment, such as fixed multiple subframes or frames; and a configuration starting point of the second transmission subframe set R2 used when the user equipment directly communicates with the another user equipment, such as a certain subframe or frame. In this way, the user equipment may directly communicate with the another user equipment in a fixed configuration cycle and configuration starting point according to the second transmission subframe set corresponding to the information acquired in step 201.

Step 202: Directly transmit data to the another user equipment on the second transmission subframe set R2 of the user equipment.

It should be noted that, the base station may further send information of the first transmission subframe set R1 determined for each user equipment to a corresponding user equipment, where the information includes positions of, the number of and usage states of subframes used for transmitting uplink data information, uplink response feedback information and channel state information. In this way, the user equipment may transmit the uplink information to the base station on the first transmission subframe set.

In this embodiment, the base station considers a factor that the user equipments directly communicate with each other, considers a factor that each user equipment communicates with the base station, determines respective second transmission subframe sets for the user equipments which directly communicate with each other, and sends information of the second transmission subframe set to the user equipment. For a user equipment, after acquiring the information of the second transmission subframe set of the user equipment, the user equipment directly transmits data to another user equipment on the second transmission subframe set of the user equipment according to the acquired information. In this way, when two user equipments directly communicate with each other, and when the base station determines transmission resources for data transmission, not only a factor that the base station communicates with each user equipment is considered, but also a factor that the user equipments directly communicate with each other is also considered, so that the base station properly allocates transmission resources to the user equipment, thereby improving system resource utilization efficiency.

In a specific embodiment, in addition to performing the foregoing step 201 to step 202, the current user equipment may further acquire information of a second transmission subframe set R2 determined by the base station for another user equipment that directly communicates with the current user equipment, and receive, on the second transmission subframe set of the another user equipment, data directly transmitted by the another user equipment.

In this case, if an idle subframe is reserved between the subframe included in the second transmission subframe set determined by the base station for the current user equipment and the subframe included in the second transmission subframe set determined by the base station for the another user equipment, the current user equipment further performs state switching on the reserved idle subframe between sending data and receiving data. If a period of protection time is reserved in the subframe included in the second transmission subframe set determined by the base station for the current user equipment or in the subframe included in the second transmission subframe set determined by the base station for the another user equipment, the current user equipment performs state switching in the reserved protection time between sending data and receiving data. In this way, the base station provides, in a manner of reserving the idle subframe or reserving the protection time in the subframe, enough time for the user equipment to perform state switching between sending data and receiving data.

Figure 6:
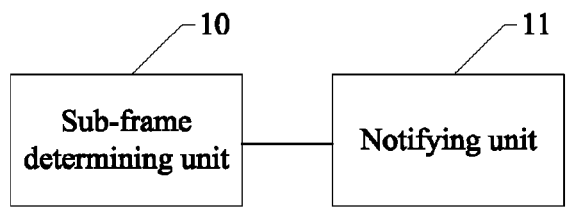
FIG. 6 is a schematic structural diagram of a base station according to an embodiment of the present invention.

An embodiment of the present invention further provides a base station, which is mainly configured to determine a transmission subframe for data transmission between user equipments which directly communicate with each other. A schematic structural diagram is as shown in FIG. 6, and includes the following units.

A subframe determining unit 10 is configured to determine a first transmission subframe set R1 and a second transmission subframe set R2 of the user equipment within a predetermined time range, where the first transmission subframe set R1 is a set of a subframe on which the user equipment transmits uplink information, the second transmission subframe set R2 is a set of a subframe on which the user equipment directly transmits data to another user equipment, and intersection sets between the second transmission subframe set of the user equipment and a first transmission subframe set of another user equipment that directly communicates with the user equipment and between the second transmission subframe set of the user equipment and a second transmission subframe set of the another user equipment that directly communicates with the user equipment are empty. The predetermined time range may be a frame formed by multiple subframes or a super frame formed by multiple frames.

It may be understood that, the subframe determining unit 10 may further enable transmittable subframes included in the first transmission subframe set and the second transmission subframe set that are determined for each of the user equipments which directly communicate with each other to be consecutive within the predetermined time range, so that transmission subframes on which a user equipment sends data are consecutive, thereby reducing a switch point at which the user equipment performs state switching between sending data and receiving data.

The subframe determining unit 10 reserves an idle subframe between subframes included in second transmission subframe sets of any two user equipments which directly communicate with each other; or, the subframe determining unit 10 reserves a period of protection time in a subframe included in a second transmission subframe set of at least one user equipment of the user equipments which directly communicate with each other. In this way, the user equipment performs state switching between sending data and receiving data on the reserved idle subframe or in the reserved protection time.

A notifying unit 11 is configured to notify information of the second transmission subframe set R2 determined by the subframe determining unit 10 to the user equipment, where the information of the second transmission subframe set R2 includes information such as the number of included subframes, a position of an included subframe and a usage state of the included subframe, and may further include information of the idle subframe or the protection time reserved by the subframe determining unit 10.

The notifying unit 11 may notify information of a second transmission subframe set of any one of the user equipments which directly communicate with each other to a user equipment, and notify information of a second transmission subframe set of another user equipment that directly communicates with the user equipment to the user equipment. In this way, each user equipment may know a transmission subframe on which data is directly transmitted to another user equipment, and a transmission subframe on which data directly transmitted by the another user equipment is received.

When notifying the information of the transmission subframe set to the user equipment, the notifying unit 11 may specifically use an information element newly added in dedicated signaling or common signaling of radio resource control to indicate the position of the subframe and/or the usage state of the subframe included in the second transmission subframe set, and send the dedicated signaling or the common signaling of the radio resource control to the user equipment; or, use a control element newly added in media access control layer signaling to indicate the position of the subframe and/or the usage state of the subframe included in the second transmission subframe set, and send the media access control layer signaling to the user equipment; or, use a control field newly added in signaling of a physical layer control channel to indicate the position of the subframe and/or the usage state of the subframe included in the second transmission subframe set, and send the signaling of the physical layer control channel to the user equipment. The new information element, or the new control element, or the new control field may further indicate: a configuration cycle of the second transmission subframe set used when the user equipment directly communicates with another user equipment; and, a configuration starting point of the second transmission subframe set used when the user equipment directly communicates with another user equipment. In this way, the user equipment may directly communicate with the another user equipment in the fixed configuration cycle according to the second transmission subframe set.

In the base station of this embodiment, the subframe determining unit 10 determines the first transmission subframe set for each of the user equipments which directly communicate with each other to transmit uplink information within the predetermined time range and the second transmission subframe set for each user equipment to directly transmit data to the another user equipment within the predetermined time range respectively, where intersection sets between a second transmission subframe set determined for any user equipment and a first transmission subframe set determined for another user equipment that directly communicates with the user equipment and between the second transmission subframe set determined for the any user equipment and a second transmission subframe set determined for the another user equipment that directly communicates with the user equipment are empty; and finally, the information of the determined second transmission subframe set is notified to the user equipment. In this way, when two user equipments directly communicate with each other, and when the base station determines transmission resources for data transmission, not only a factor that the base station communicates with each user equipment is considered, but also a factor that the user equipments directly communicate with each other is also considered, so that the base station properly allocates transmission resources to the user equipment, thereby improving system resource utilization efficiency.

Figure 7:
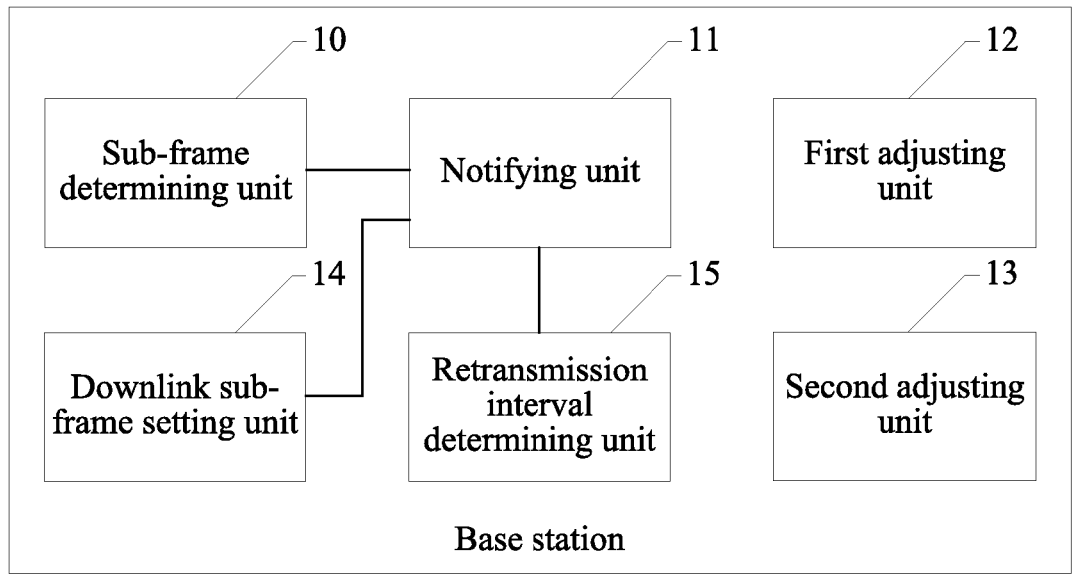
FIG. 7 is a schematic structural diagram of another base station according to an embodiment of the present invention.

Referring to FIG. 7, in a specific embodiment, in addition to the structure shown in FIG. 6, the base station may further include a first adjusting unit 12, a second adjusting unit 13, a downlink subframe setting unit 14 and a retransmission interval determining unit 15.

The first adjusting unit 12 is configured to: when a subframe subset R12 of the user equipment is not included in a union set of a subframe subset R11 and the second transmission subframe set R2 of the user equipment, adjust a subframe determined for the user equipment to transmit downlink data, so that the subset R12 of the subframe on which the user equipment transmits uplink response feedback information corresponding to the downlink data is included in the union set of the subframe subset R11 and the second transmission subframe set R2 of the user equipment.

The uplink information transmitted by the user equipment includes uplink data information and uplink response feedback information, and accordingly, the first transmission subframe set R1 determined by the subframe determining unit 10 for the user equipment includes: a subset R11 of a subframe on which the user equipment transmits the uplink data information and a subset R12 of a subframe on which the user equipment transmits the uplink response feedback information.

The second adjusting unit 13 is configured to: when a subframe subset R13 of the user equipment is not included in the union set of the subframe subset R11 and the second transmission subframe set R2 of the user equipment, adjust the subframe subset R13 of the user equipment, so that the subset R13 of the subframe on which the user equipment transmits channel state information is included in the union set of the subframe subset R11 and the second transmission subframe set R2 of the user equipment.

In this case, the uplink information transmitted by the user equipment further includes the channel state information, and accordingly, the first transmission subframe set determined by the subframe determining unit 10 for the user equipment further includes the subset R13 of the subframe on which the user equipment transmits the channel state information.

The downlink subframe setting unit 14 is configured to set a transmission subframe for downlink retransmission data for the user equipment, so that a subframe on which the user equipment transmits uplink response feedback information corresponding to the downlink retransmission data is included in the subset R12 of the subframe for transmitting the uplink response feedback information.

The retransmission interval determining unit 15 is configured to determine a retransmission interval at which the user equipment transmits the downlink retransmission data as a fixed value, so that a subframe on which the user equipment transmits uplink response feedback information corresponding to the downlink retransmission data is included in the subset R12 of the subframe on which the user equipment transmits the uplink response feedback information.

The retransmission interval is the number of subframes between a moment of a subframe on which the user equipment transmits downlink data for the first time and a moment of a subframe on which the user equipment retransmits the downlink data for the first time; or, the retransmission interval is the number of subframes between a moment of a subframe on which the user equipment retransmits downlink data for the $n^{th}$ time and a moment of a subframe on which the user equipment retransmits the downlink data for the $(n+1)^{th}$ time, where n is a positive integer.

In the base station of this embodiment, after the subframe determining unit 10 determines the first transmission subframe set and the second transmission subframe set for each user equipment, through adjustment of the first adjusting unit 12, the subset R12 of the subframe on which the user equipment transmits the uplink response feedback information corresponding to the downlink data may be included in the union set of the subframe subset R11 and the second transmission subframe set; and through adjustment of the second adjusting unit 13, the subset R13 of the subframe on which the user equipment transmits the channel state information may be included in the union set of the subframe subset R11 and the second transmission subframe set. And in this embodiment, the downlink subframe setting unit 14 sets the transmission subframe on which the user equipment transmits the downlink data, the retransmission interval determining unit 15 determines the retransmission interval at which the user equipment retransmits the downlink data as the fixed value, and the notifying unit 11 may further notify the user equipment of information such as information of the subframe set by the downlink subframe setting unit 14 and the retransmission interval determined by the retransmission interval determining unit 15. In another embodiment, the subframe determining unit 10, the first adjusting unit 12, the second adjusting unit 13, the downlink subframe setting unit 14 and the retransmission interval determining unit 15 in the base station may all be included in a processor.

It should be noted that, the transmission subframe may be determined by the units of the base station shown in FIG. 6 and FIG. 7 according to the method described in the embodiment corresponding to FIG. 1, which is not repeatedly described herein.

Figure 8:
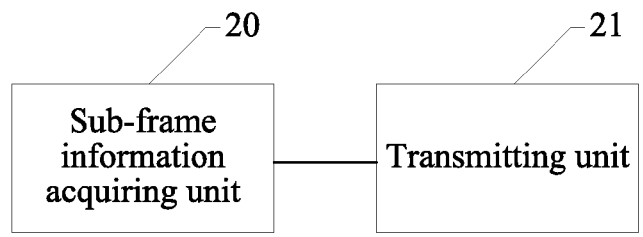
FIG. 8 is a schematic structural diagram of a user equipment according to an embodiment of the present invention.

An embodiment of the present invention further provides a user equipment. The user equipment may directly communicate with another user equipment. A schematic structural diagram is as shown in FIG. 8, and includes:

A subframe information acquiring unit 20 is configured to acquire information of a second transmission subframe set of the user equipment, where the second transmission subframe set is a set of a subframe on which the user equipment directly transmits data to another user equipment within a predetermined time range, and the information of the second transmission subframe set includes information such as a position of an included subframe, the number of included subframes and a usage state of the included subframe.

The subframe information acquiring unit 20 may be configured to receive dedicated signaling or common signaling of radio resource control, and learn, according to an information element newly added in the dedicated signaling or the common signaling, the position of the subframe and/or the usage state of the subframe included in the second transmission subframe set of the user equipment. The subframe information acquiring unit 20 is further configured to receive media access control layer signaling, and learn, according to a control element newly added in the media access control layer signaling, the position of the subframe and/or the usage state of the subframe included in the second transmission subframe set of the user equipment. The subframe information acquiring unit 20 is further configured to receive signaling of a physical layer control channel, and learn, according to a control field newly added in the signaling of the physical layer control channel, the position of the subframe and/or the usage state of the subframe included in the second transmission subframe set of the user equipment.

In a specific embodiment, the subframe information acquiring unit 20 is further configured to acquire, according to the newly added information element, or the newly added control element, or the newly added control field, a configuration cycle of the second transmission subframe set used when the user equipment directly communicates with another user equipment; and a configuration starting point of the second transmission subframe set used when the user equipment directly communicates with another user equipment.

A transmitting unit 21 is configured to directly transmit data to another user equipment on the second transmission subframe set which is of the current user equipment and corresponds to the information acquired by the subframe information acquiring unit 20.

It should be noted that, the subframe information acquiring unit 20 may further acquire information of a first transmission subframe set determined by the base station for the user equipment, including information such as a position of a subframe for transmitting uplink data information, uplink response feedback information or channel state information, and accordingly, the transmitting unit 21 is further configured to transmit the uplink information to the base station on the first transmission subframe set according to the information of the first transmission subframe set.

In the embodiment of the present invention, the base station considers a factor that the user equipments directly communicate with each other, considers a factor that each user equipment communicates with the base station, determines respective second transmission subframe sets for the user equipments which directly communicate with each other, and sends information of the second transmission subframe set to the user equipment. In the user equipment in this embodiment, after the subframe information acquiring unit 20 acquires the information of the second transmission subframe set of the user equipment, the transmitting unit 21 directly transmits data to another user equipment on the second transmission subframe set of the user equipment. In this way, when two user equipments directly communicate with each other, and when the base station determines transmission resources for data transmission, not only a factor that the base station communicates with each user equipment is considered, but also a factor that the user equipments directly communicate with each other is also considered, so that the base station properly allocates transmission resources to the user equipment, thereby improving system resource utilization efficiency.

Figure 9:
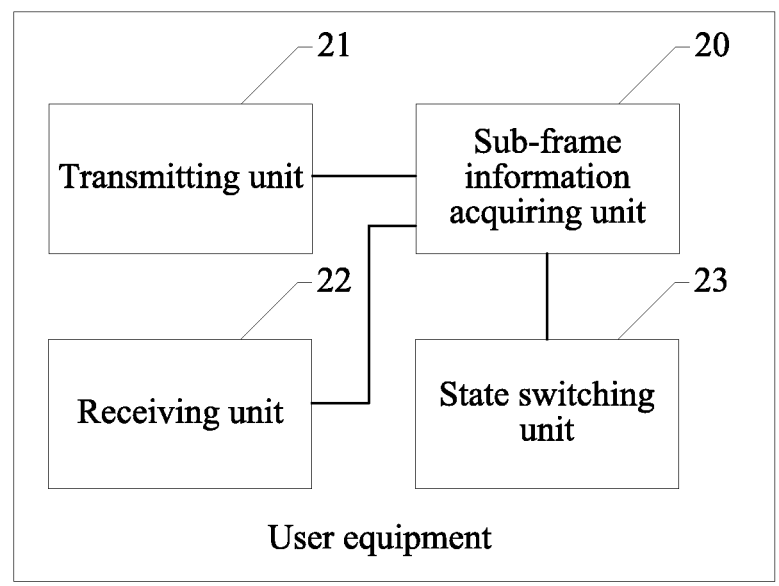
FIG. 9 is a schematic structural diagram of another user equipment according to an embodiment of the present invention.

As shown in FIG. 9, in a specific embodiment, in addition to the structure shown in FIG. 8, the user equipment may further include a receiving unit 22 and a state switching unit 23.

The subframe information acquiring unit 20 is further configured to acquire information of a second transmission subframe set for the current user equipment to receive data directly transmitted by another user equipment, that is, information of the second transmission subframe set determined by the base station for the another user equipment.

The receiving unit 22 is configured to receive, on the second transmission subframe set of the another user equipment and according to the information which is of the second transmission subframe set of the another user equipment and is acquired by the subframe information acquiring unit 20, the data directly transmitted by the another user equipment.

The state switching unit 23 is configured to: if an idle subframe is reserved between the subframe included in the second transmission subframe set of the user equipment and the subframe included in the second transmission subframe set of the another user equipment, perform state switching on the reserved idle subframe between sending data and receiving data according to the information acquired by the subframe information acquiring unit 20.

Or, the state switching unit 23 is configured to: if a period of protection time is reserved in the subframe included in the second transmission subframe set of the user equipment, or in the subframe included in the second transmission subframe set of the another user equipment, perform state switching within the reserved protection time between sending data and receiving data according to the information acquired by the subframe information acquiring unit 20.

An embodiment of the present invention further provides a system for determining a transmission subframe, where the system is used to determine a transmission subframe for data transmission between multiple user equipments which directly communicate with each other, and includes a base station and at least two user equipments which directly communicate with each other.

The base station is configured to determine a first transmission subframe set and a second transmission subframe set of the user equipment within a predetermined time range, where the first transmission subframe set is a set of a subframe on which the user equipment transmits uplink information, the second transmission subframe set is a set of a subframe on which the user equipment directly transmits data to another user equipment, and intersection sets between the second transmission subframe set of the user equipment and a first transmission subframe set of another user equipment that directly communicates with the user equipment and between the second transmission subframe set of the user equipment and a second transmission subframe set of the another user equipment that directly communicates with the user equipment are empty; and notify information of the determined second transmission subframe set to the user equipment.

The user equipment is configured to acquire the information of the second transmission subframe set of the user equipment, and directly transmit data to the another user equipment on the second transmission subframe set of the user equipment.

A structure of the base station in this embodiment may be as shown in FIG. 6 or FIG. 7, and a structure of the user equipment may be as shown in FIG. 8 or FIG. 9, which are not repeatedly described herein.

Persons of ordinary skill in the art should understand that all or part of the steps in the methods of the foregoing embodiments may be implemented by a program instructing relevant hardware. The program may be stored in a computer readable storage medium. The storage medium may include a read only memory (ROM), a random access memory (RAM), a magnetic disk, or an optical disk, or the like.

The method, the system and the equipment for determining a transmission subframe provided by the embodiments of the present invention are described in detail in the foregoing. The principle and the implementation manners of the present invention are described herein by using specific examples. The description about the foregoing embodiments is merely used to help understanding of the method and the core ideas of the present invention. Persons of ordinary skill in the art can make variations to the specific implementation manners and application scopes according to the ideas of the present invention. Therefore, the content of the specification shall not be construed as a limitation to the present invention.

What is claimed is:

1. A method for determining a transmission subframe for data transmission between a first user equipment and a second user equipment, wherein the first user equipment and the second user equipment directly communicate with each other and with a base station, the method comprising:

determining a first transmission subframe set and a second transmission subframe set of the first user equipment within a predetermined time range, wherein the first transmission subframe set is a set of a subframe which the first user equipment transmits uplink information to the base station, the second transmission subframe set is a set of a subframe on which the first user equipment directly transmits data the second user equipment, wherein the second transmission subframe set does not overlap in time with a subframe in which the second user equipment transmits uplink information to the base station or with a subframe in which the second user equipment directly on transmits data to the first user equipment; and providing information of the second transmission subframe set of the first user equipment to the first user equipment;

wherein the uplink information comprises uplink data information and uplink response feedback information;

wherein the first transmission subframe set of the first user equipment comprises a first subset of a subframe on which the first user equipment transmits the uplink data information and a second subset of a subframe on which the first user equipment transmits the uplink response feedback information; and in response to resources of the second subframe subset not being comprised in a union set of the first subframe subset and the second transmission subframe set of the first user equipment, the method further comprises re-determining a subframe for the first user equipment to transmit downlink data, so that the second subset of the subframe on which the first user equipment transmits uplink response feedback information corresponding to the downlink data is comprised in the union set of the first subframe subset and the second transmission subframe set of the first user equipment, wherein the second subset and the subframe for the first user equipment to transmit downlink data have a pre-configured relationship.

2. The method according to claim 1, wherein the transmitted uplink information further comprises channel state information, and accordingly, the first transmission subframe set of the first user equipment further comprises a third subset of a subframe on which the first user equipment transmits the channel state information; and if the third subframe subset is not comprised in the union set of the first subframe subset and the second transmission subframe set of the first user equipment, the method further comprises adjusting the third subframe subset, so that the third subframe subset is comprised in the union set of the first subframe subset and the second transmission subframe set of the first user equipment.

3. The method according to claim 1, further comprising providing information to the user equipment to the first user equipment regarding the subframe in which the second user equipment directly transmits data to the first user equipment.

4. The method according to claim 1, wherein providing information of the second transmission subframe set of the first user equipment to the first user equipment comprises:
   using an information element newly added in dedicated signaling or common signaling of radio resource control to indicate the information of the second transmission subframe set of the first user equipment, and sending the dedicated signaling or the common signaling of the radio resource control to the first user equipment; or
   using a control element newly added in media access control layer signaling to indicate the information of the second transmission subframe set of the first user equipment, and sending the media access control layer signaling to the first user equipment; or
   using a control field newly added in signaling of a physical layer control channel to indicate the information of the second transmission subframe set of the first user equipment, and sending the signaling of the physical layer control channel to the first user equipment;
   wherein the information of the second transmission subframe set of the first user equipment comprises at least one type of the following information a position of a subframe and a usage state of a subframe.

5. The method according to claim 1, wherein the first transmission subframe set and the second transmission subframe set have a same frequency.

6. A method for determining a transmission subframe, method comprising:
   acquiring a first transmission subframe set and a second transmission subframe set of a first user equipment within a predetermined time range, wherein the first transmission subframe set is a set of a subframe on which the first user equipment transmits uplink information to a base station,
   acquiring information of a second transmission subframe set of the first user equipment within a predetermined time range, wherein the second transmission subframe set is a set of a subframe on which the first user equipment directly transmits data to a second user equipment;
   transmitting uplink information to the base station on the first transmission subframe set of the first user equipment; and
   directly transmitting data to the second user equipment on the second transmission subframe set of the first user equipment;
   wherein the uplink information comprises uplink data information and uplink response feedback information;
   wherein the first transmission subframe set of the first user equipment comprises a first subset of a subframe on which the first user equipment transmits the uplink data information and a second subset of a subframe on which the first user equipment transmits the uplink response feedback information; and
   wherein the second subset and a subframe in which the first user equipment receives downlink data have a pre-configured relationship, and wherein the first user equipment receives downlink data in manner that the second subset of the subframe on which the first user equipment transmits uplink response feedback information corresponding to the downlink data is comprised in a union set of the first subframe subset and the second transmission subframe set of the first user equipment.

7. The method according to claim 6, further comprising:
   acquiring information of a second transmission subframe set of the second user equipment that directly communicates with the first user equipment, wherein the second transmission subframe set of the second user equipment is a set of a subframe on which the second user equipment directly transmits data to the first user equipment; and
   receiving, on the second transmission subframe set of the second user equipment, data directly transmitted by the second user equipment.

8. The method according to claim 6, wherein acquiring the information of the second transmission subframe set of the first user equipment within a predetermined time range comprises:
   receiving dedicated signaling or common signaling of radio resource control and learning the information of the second transmission subframe set of the first user equipment according to an information element newly added in the dedicated signaling or the common signaling; or
   receiving media access control layer signaling and learning the information of the second transmission subframe set of the first user equipment according to a control element newly added in the media access control layer signaling; or
   receiving signaling of a physical layer control channel and learning the information of the second transmission subframe set of the first user equipment according to a control field newly added in the signaling of the physical layer control channel;
   wherein the information of the second transmission subframe set of the first user equipment comprises a position of a subframe or a usage state of a subframe.

9. A base station, configured to determine a transmission subframe for data transmission between a first user equipment and a second user equipment, wherein the first user equipment and the second user equipment directly communicate with each other, the base station comprising:
   a processor; and
   a computer-readable storage medium storing a program to be executed by the processor, the program including instructions for:
      determining a first transmission subframe set and a second transmission subframe set of the first user equipment within a predetermined time range, wherein the first transmission subframe set is a set of a subframe on which the first user equipment transmits uplink information, the second transmission subframe set is a set of a subframe on which the first user equipment directly transmits data to the second user equipment, and wherein the second transmission subframe set does not overlap in time with a subframe in which the second user equipment transmits uplink information to the base station or with a subframe in which the second user equipment directly transmits data to the first user equipment; and a transmitter, configured to notify information of the second transmission subframe set to the first user equipment;

wherein the uplink information comprises uplink data information and uplink response feedback information;

wherein the first transmission subframe set for the first user equipment comprises a first subset of a subframe on which the first user equipment transmits the uplink data information and a second subset of a subframe on which the first user equipment transmits the uplink response feedback information; and wherein the program further includes instructions for, when a resource of the second subframe subset of the user equipment is not comprised in a union set of the first subframe subset and the second transmission subframe set of the first user equipment, re-determining a subframe determined for the first user equipment to transmit downlink data, so that the second subset of the subframe on which the first user equipment transmits uplink response feedback information corresponding to the downlink data is comprised in the union set of the first subframe subset and the second transmission subframe set of the first user equipment, wherein the second subset and the subframe for the first user equipment to transmit downlink data have a pre-configured relationship.

10. The base station according to claim 9, wherein the program further includes instructions for to:

using an information element newly added in dedicated signaling or common signaling of radio resource control to indicate the information of the second transmission subframe set, and to send the dedicated signaling or the common signaling of the radio resource control to the first user equipment; or use a control element newly added in media access control layer signaling to indicate the information of the second transmission subframe set, and to send the media access control layer signaling to the first user equipment; or using control field newly added in signaling of a physical layer control channel to indicate the information of the second transmission subframe set, and to send the signaling of the physical layer control channel to the first user equipment;

wherein the information of the second transmission subframe set of the first user equipment comprises: a position of a subframe and/or a usage state of a subframe.

11. The base station according to claim 9, wherein the first transmission subframe set and the second transmission subframe set have a same frequency.

12. A first user equipment, comprising:
a processor: and
a computer-readable storage medium storing a program to be executed by the processor,
the program including instructions for:
acquiring a first transmission subframe set and a second transmission subframe set of the first user equipment within a predetermined time range, wherein the first transmission subframe set is a set of a subframe on which the first user equipment transmits uplink information to a base station;

acquiring information of a second transmission subframe set of the first user equipment, wherein the second transmission subframe set is a set of a subframe on which the first user equipment directly transmits data to a second user equipment within a predetermined time range; and a transmitter, configured to directly transmit data to the second user equipment on the second transmission subframe set which is of the first user equipment;

wherein the uplink information comprises uplink data information and uplink response feedback information;

wherein the first transmission subframe set of the first user equipment comprises a first subset of a subframe on which the first user equipment transmits the uplink data information and a second subset of a subframe on which the first user equipment transmits the uplink response feedback information; and wherein the second subset and a subframe in which the first user equipment receives downlink data have a pre-configured relationship, and wherein the first user equipment receives downlink data in manner that the second subset of the subframe on which the first user equipment transmits uplink response feedback information corresponding to the downlink data is comprised in a union set of the first subframe subset and the second transmission subframe set of the first user equipment.

13. The first user equipment according to claim 12, wherein the program further includes instructions for acquiring information of a second transmission subframe set for the first user equipment to receive data directly transmitted by the second user equipment; and wherein the first user equipment further comprises a receiver, configured to receive, according to the second transmission subframe set for the first user equipment to receive data directly transmitted by the second user equipment, the data directly transmitted by the second user equipment.

14. The first user equipment according to claim 12, wherein the program further includes instructions for:

receiving dedicated signaling or common signaling of radio resource control, and learning the information of the second transmission subframe set of the first user equipment according to an information element newly added in the dedicated signaling or the common signaling; or receiving media access control layer signaling, and learning the information of the second transmission subframe set of the first user equipment according to a control element newly added in the media access control layer signaling; or receiving signaling of a physical layer control channel, and learning the information of the second transmission subframe set of the first user equipment according to a control field newly added in the signaling of the physical layer control channel;

wherein the information of the second transmission subframe set of the first user equipment comprises: a position of a subframe and/or a usage state of a subframe.

15. A system for determining a transmission subframe, used for determining a transmission subframe for data transmission between a first user equipment and a second user equipment, wherein the first user equipment and the second user equipment directly communicate with each other, the system comprising:
- a base station;
- the first user equipment; and
- the second user equipment, wherein the first user equipment and the second user equipment directly communicate with each other;
- wherein the base station is configured to:
- determine a first transmission subframe set and a second transmission subframe set of the first user equipment within a predetermined time range, wherein the first transmission subframe set is a set of a subframe on which the first user equipment transmits uplink information, the second transmission subframe set is a set of a subframe on which the first user equipment directly transmits data to the second user equipment, and wherein the second transmission subframe set does not overlap in time with a subframe in which the second user equipment transmits uplink information to the base station or with a subframe in which the second user equipment directly transmits data to the first user equipment; and
- notify information of the determined second transmission subframe set to the first user equipment; and
- wherein the first user equipment is configured to acquire the information of the second transmission subframe set of the first user equipment, and directly transmit data to the second user equipment on the second transmission subframe set of the first user equipment;
- wherein the uplink information comprises uplink data information and uplink response feedback information;
- wherein the first transmission subframe set of the first user equipment comprises a first subset of a subframe on which the first user equipment transmits the uplink data information and a second subset of a subframe on which the first user equipment transmits the uplink response feedback information; and
- wherein the second subset and a subframe in which the first user equipment receives downlink data have a pre-configured relationship, and wherein the first user equipment receives downlink data in manner that the second subset of the subframe on which the first user equipment transmits uplink response feedback information corresponding to the downlink data is comprised in a union set of the first subframe subset and the second transmission subframe set of the first user equipment.

* * * * *